(12) United States Patent
Kim et al.

(10) Patent No.: US 8,743,114 B2
(45) Date of Patent: Jun. 3, 2014

(54) METHODS AND SYSTEMS TO DETERMINE CONSERVATIVE VIEW CELL OCCLUSION

(75) Inventors: Changkyu Kim, San Jose, CA (US); Jatin Chhugani, Santa Clara, CA (US); Christian Bienia, Princeton, NJ (US); Daehyun Kim, San Jose, CA (US); Anthony Ngueyn, Castro Valley, CA (US); Sanjeev Kumar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 12/234,988

(22) Filed: Sep. 22, 2008

(65) Prior Publication Data

US 2010/0073368 A1 Mar. 25, 2010

(51) Int. Cl.
*G06T 15/00* (2011.01)
*G06T 15/40* (2011.01)

(52) U.S. Cl.
USPC .......................................... 345/422; 345/419

(58) Field of Classification Search
CPC ....... F25D 21/006; F25D 21/02; G06T 15/40; G06T 15/405; G06T 15/005; G06T 15/503; G06T 19/00; G06T 17/20; G06T 17/00; G06T 15/10; G06T 15/00; G09G 5/393
USPC .................................. 345/422, 419
See application file for complete search history.

(56) References Cited

U.S. PATENT DOCUMENTS

| 6,226,003 | B1 * | 5/2001 | Akeley ........................... 345/419 |
| 2003/0187891 | A1 * | 10/2003 | Cheng ........................... 708/290 |
| 2006/0268135 | A1 * | 11/2006 | Lim et al. ...................... 348/243 |
| 2008/0221711 | A1 * | 9/2008 | Trainer ........................... 700/54 |

OTHER PUBLICATIONS

"Visibility Culling using Hierarchical Occlusion Maps" copyright 1997 by the Association for Computing Machinery, Inc.*
Hansong Zhang, "Visibility Culling using Hierarchical Occlusion Maps", copyright 1997 by the Association for Computing Machinery, Inc.*
Wonka, Peter et al., "Occluder Shadows for Fast Walkthroughs of Urban Environments", Proceedings of Eurographics, Milan, Italy, vol. 18 (1999), No. 3, (1999), 10 pages.
Chhugani, Jatin, et al, "vLOD: High-Fidelity Walkthrough of Large Virtual Environments", IEEE Transactions on Visualization and Computer Graphics, vol. 11, No. 1, Jan./Feb. 2005, 13 pages.

* cited by examiner

*Primary Examiner* — Kee M Tung
*Assistant Examiner* — Frank Chen
(74) *Attorney, Agent, or Firm* — Garrett IP, LLC

(57) ABSTRACT

Methods and systems to determine view cell occlusion, including to project objects of a 3-dimensional graphics environment to a 2-dimensional image plane with respect to the view point, to reduce sizes of corresponding object images, to generate an occluder map from the reduced-size object images, to compare at least a portion of the object images to the occluder map, and to identify an object as occluded with respect to the view cell when pixel depth values of the object image are greater than corresponding pixel depth values of the occluder map. Methods and systems to reduce an object image size include methods and systems to nullify pixel depth values within a radius of an edge pixel, and to determine the radius as a distance from the edge pixel to a second pixel so that a line between the view point and the second pixel is parallel with one or more of a line and a plane that is tangential to a sphere enclosing the view cell and a point on the object that corresponds to the edge pixel.

20 Claims, 7 Drawing Sheets

METHODS AND SYSTEMS TO DETERMINE CONSERVATIVE VIEW CELL OCCLUSION

BACKGROUND

A 3-dimensional computer graphics environment, such as an interactive walk-through virtual environment, may include millions of triangles. Processing of such graphics data for display is computationally intensive. In many situations, only a relatively small portion of an environment is visible to a user at a given time. Thus, algorithms have been developed to cull triangles that not visible to the user, to reduce the amount of data sent to a graphics pipeline. Culling techniques include view frustum culling and occlusion culling.

View frustum culling is a technique where only triangles contained in a current view frustum are sent to a graphics pipeline.

Occlusion culling techniques seek to identify and cull triangles that are occluded behind other triangles. Occlusion culling techniques include view point and region based techniques.

View point techniques seek to identify occluded triangles with respect to a current view point, or virtual position of a user. View point based visibility tests are re-computed for every frame.

Region based techniques seek to identify occluded triangles with respect to a range of view points, or a view cell. Region based techniques seek to exploit spatial coherence within visible geometry for proximate viewpoints, and temporal coherence of user movement, to amortize costs of visibility culling over multiple frames. Once computed, a visible set is valid until a user moves out of the view cell.

Region based techniques include orthographic projection to project objects onto a bitmap coincident with a ground plane, and thus referred to as rendering in 2.5-dimensions. Orthographic projection involves storing of substantial geometry of rendered objects.

BRIEF DESCRIPTION OF THE DRAWINGS/FIGURES

Figure 1:
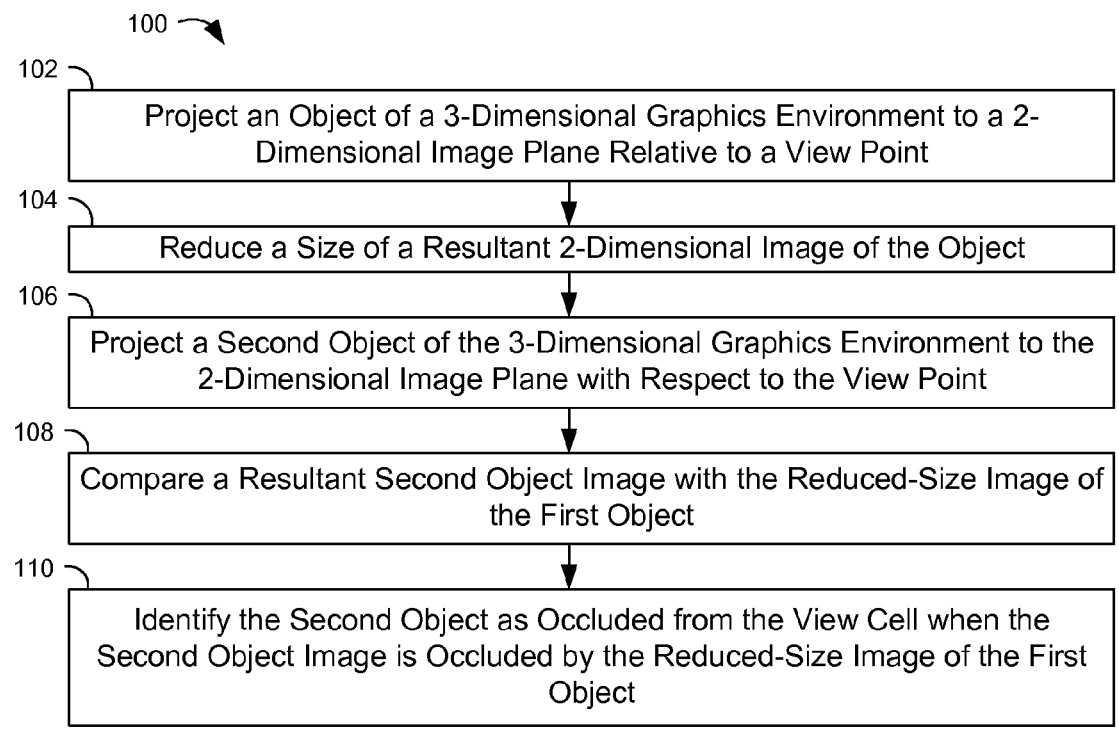
FIG. 1 is a process flowchart of an exemplary method of determining view cell occlusion.

In the drawings, the leftmost digit(s) of a reference number identifies the drawing in which the reference number first appears.

DETAILED DESCRIPTION

FIG. 1 is a process flowchart of an exemplary method 100 of determining view cell occlusion.

At 102, an object of a 3-dimensional graphics environment is projected onto a 2-dimensional image plane, relative to a view point. The object may include a polygon, such as a triangle, and may include a plurality of proximate polygons. The projecting may include retrieving the object from one or more computer readable data files.

The projecting may include or be proceeded by grouping a set of proximate or adjacent polygons as an object. A group of polygons may be limited to, for example, between 200 and 300 polygons, for processing efficiencies.

The projecting may include rasterizing the object to the 2-dimensional image plane.

The projecting may include populating a depth buffer having entries corresponding to pixels of the 2-dimensional image plane, with depth values associated with corresponding surface points of the object facing the 2-dimensional image plane.

The projecting of the object to the 2-dimensional image plane with respect to a viewpoint essentially renders an umbra of the object with respect to the viewpoint, wherein pixel depth values correspond to surface points of the object surface, beyond which other objects are occluded. Rays from the view point and through boundary pixels of the projected image denote tangential boundaries of the umbra. An example is provided below with respect to FIG. 2.

Figure 2:
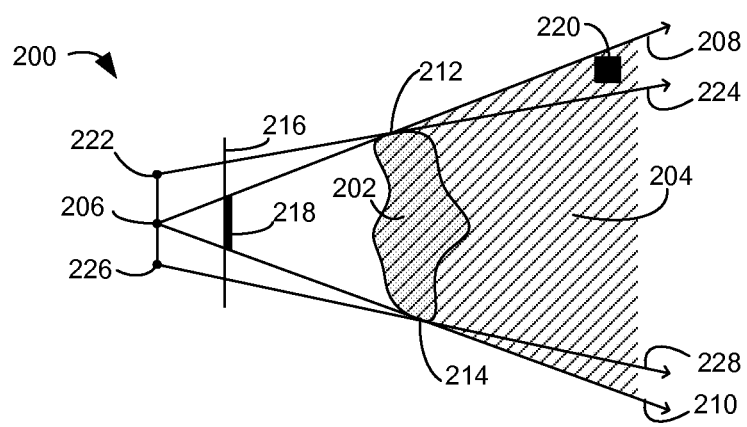
FIG. 2 is an illustration of an exemplary graphics environment, including an object having a corresponding umbra relative to a view point.

FIG. 2 is an illustration of an exemplary graphics environment 200, including an object 202 having a corresponding umbra 204 relative to a view point 206. A 2-dimensional cross-section of umbra 204 is defined by rays 208 and 210 that intersect view point 206 and respective edge points 212 and 214 of object 202.

When object 202 is projected onto a 2-dimensional image plane 216, pixels of a corresponding image 218, and depth values associated with the pixels, represent a surface of object 202 that faces image plane 216. The pixels and depth values essentially define umbra 204 with respect to view point 206, wherein the depth values define distances beyond which other objects are occluded by object 202.

Visibility of an object 220 may be determined by projecting object 220 to image plane 216, identifying pixels of object 220 that fall within image 218, and comparing corresponding pixel depth values. When all of the pixels of the image of object 220 fall within image 218, and when pixel depth values corresponding to the image of object 220 are greater than corresponding pixel depth values of image 218, object 220 is within umbra 204, and thus occluded with respect to view point 206.

Object 220 may, however, be visible from other proximate view points, such as view point 222, as illustrated by a ray 224 between view point 222 and edge point 212 of object 202. Similarly, other areas within umbra 204 may be visible to other proximate view points, such as a view point 226, as illustrated by a ray 228.

At 104, the projected image is reduced, or shrunk, resulting in a corresponding reduced-sized umbra. The shrinking may include shrinking the image, and thus the corresponding umbra, so that objects visible from the first view point are also visible from proximate view. Exemplary shrinking is described below with respect to FIGS. 3-7.

Shrinking may include nullifying depth values in a depth buffer, corresponding to pixels proximate to an edge of an image. A shrinking amount may be calculated relative to each image edge pixel, or a portion thereof. Pixels may be nullified within a radius of an edge pixel, defined as the shrinking amount.

Identification of an edge pixel may include determining whether one or more neighbor pixels are occupied by the object image. Neighbor pixels may be defined as an area of pixels surrounding a pixel of interest, such as a 3×3 array of pixels centered about the pixel of interest. Where one or more neighbor pixels are not part of the object image, the pixel of interest may be identified as an edge pixel.

Alternatively, or additionally, identification of an edge pixel may include determining whether one or more neighbor pixels belong to one or more polygons other than a current polygon associated with the pixel of interest, and determining whether such other polygons are not neighbors of the current polygon. In such a situation, the corresponding one or more neighbor pixels may not represent a continuous surface, and thus the pixel of interest may be identified as an edge pixel.

Figure 3:
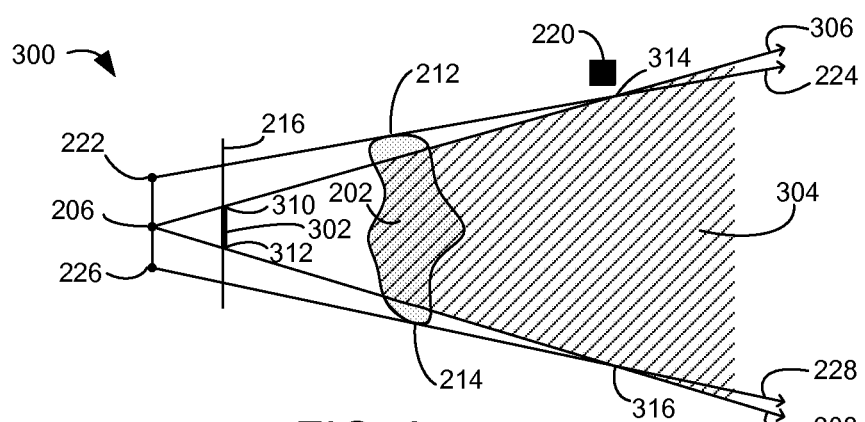
FIG. 3 is an illustration of another exemplary graphics environment, wherein an image has been reduced in size, resulting in a reduced-size umbra.

FIG. 3 is an illustration of an exemplary graphics environment 300, wherein image 218 of FIG. 2 has been shrunk, or reduced in size to an image 302, resulting in an umbra 304. A 2-dimensional cross-section of umbra 304 is defined by rays 306 and 308 between view point 206 and respective edges 310 and 312 of image 302.

In FIG. 3, rays 306 and 308 intersect rays 224 and 228 at respective points 314 and 316, beyond which umbra 304 may obscure objects from view point 206 that are visible to view point 222 or view point 226. Image shrinking may be performed such that points 314 and 316 are sufficiently distant so as to be essentially out of effective viewing range of view points 222 and 226.

Alternatively, image shrinking may be performed such that rays 306 and 308 do not intersect rays 224 and 228 at any distance, examples of which are described below with respect to FIGS. 4, 5, and 6.

Figure 4:
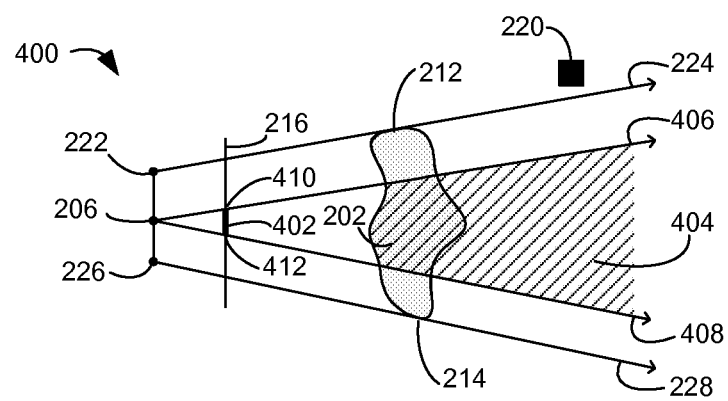
FIG. 4 is an illustration of another exemplary graphics environment, wherein an image has been reduced in size, resulting in a reduced-size umbra.

FIG. 4 is an illustration of an exemplary graphics environment 400, wherein image 218 of FIG. 2 has been shrunk or reduced in size to an image 402, resulting in an umbra 404. A 2-dimensional cross-section of umbra 404 is defined by rays 406 and 408 between view point 206 and respective edges 410 and 412 of image 402. Rays 406 and 408 are essentially parallel with rays 224 and 228. Objects that are occluded by umbra 404, with respect to view point 206, are thus also occluded respect to view points 222 and 226. Correspondingly, objects that are visible with respect to view point 206 are also visible with respect to view points 222 and 226.

Figure 5:
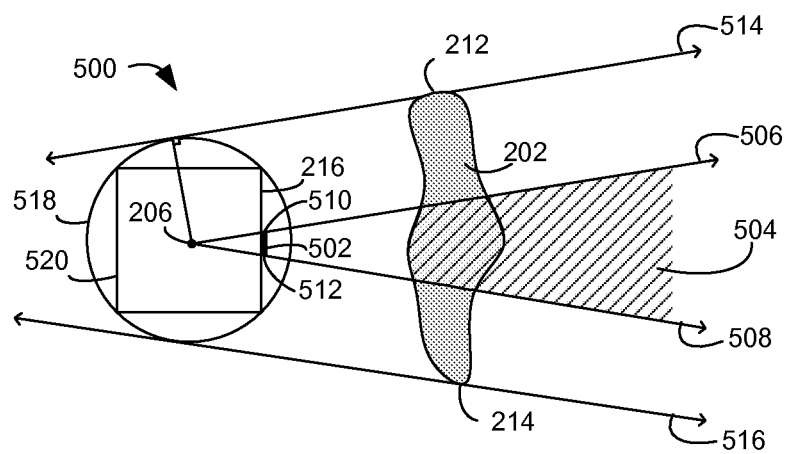
FIG. 5 is an illustration of another exemplary graphics environment, wherein an image has been reduced in size, resulting in a reduced-size umbra.

FIG. 5 is an illustration of an exemplary graphics environment 500, wherein image 218 of FIG. 2 has been shrunk or reduced in size to an image 502, resulting in an umbra 504. A 2-dimensional cross-section of umbra 504 is defined by rays 506 and 508 that intersect view point 206 and respective edges 510 and 512 of image 502. Rays 506 and 508 are essentially parallel with rays 514 and 516, respectively, which are tangential to a circle 518 centered at view point 206 of a view cell 520. Rays 514 and 516 intersect edge points 212 and 214, respectively, of object 202. The example of FIG. 5 may insure that no object is occluded by umbra 504, relative to view point 206, which may be visible from another view point within view cell 520.

Exemplary image shrinking as described in one or more examples above may be implemented with respect to multi-dimensional objects, including 3-dimensional objects, and may be implemented with respect to multidimensional view cells, such as cubic view cells.

Exemplary methods of determining shrinking amounts for images corresponding to 3-dimensional objects and 3-dimensional view cells are described below with respect to FIG. 6.

Figure 6:
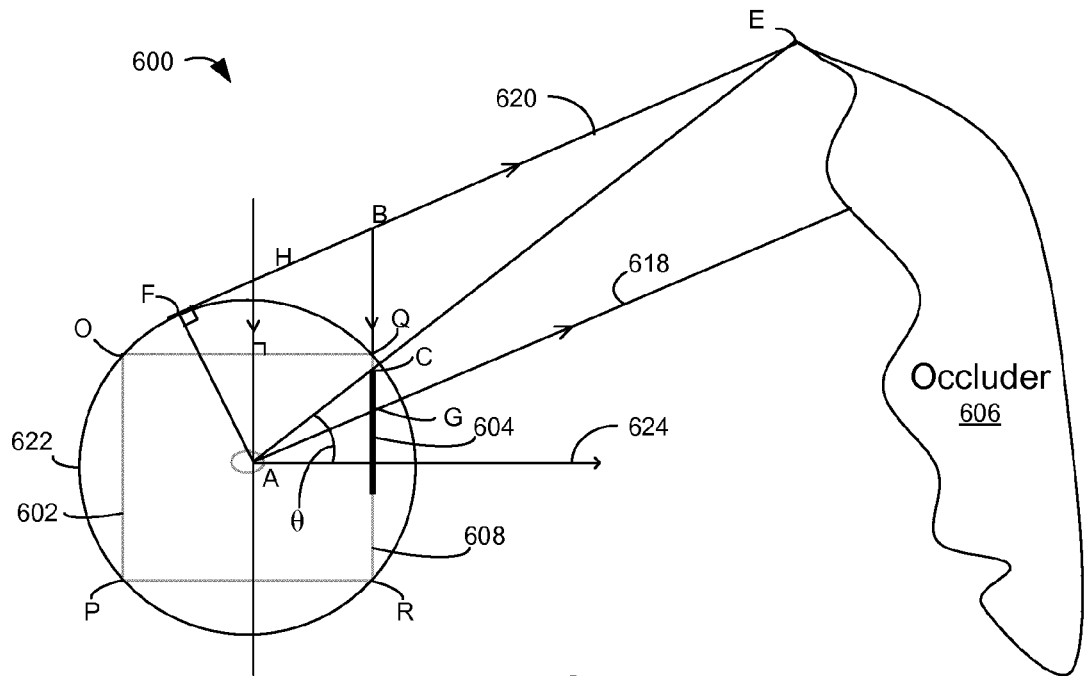
FIG. 6 is a cross-sectional illustration of another exemplary graphics environment, including a view cell.

FIG. 6 is a cross-sectional illustration of an exemplary graphics environment 600, including a view cell 602, which may be a 3-dimensional view cell, such as a cubic view cell having six image planes. Environment 600 includes an image 604 of an occluder object 606, projected onto an image plane 608 of view cell 602 relative to a view point A within view cell 602.

Image 604 includes a boundary pixel C corresponding to an edge point E of object 606. Image 604 is to be reduced in size from boundary pixel C to a position corresponding to a pixel G, and at other boundary pixels, so that the reduced size image does not occlude objects with respect to view point A, which may be visible from one or more other viewpoints of view cell 602.

Computing the shrinking distance between pixels C and G may include computing a surface that touches object 606 at edge point E, and that is tangential to view cell 602. Such a surface may be a relatively higher-order surface. The surface may be represented with a plane 620 that is tangential to a sphere 622 enclosing view cell 602 and tangential to point E, and that intersects sphere 622 at a point F and intersects point E. The cross-sectional illustration of FIG. 6 includes a cross-sectional view of sphere 622.

Computing the shrinking distances between pixels C and G may include calculating a line 618 through view point A that is parallel to a plane 620, and determining the position of pixel G as a point at which line 618 intersects image plane 608. Such a calculation may be performed using similar triangles, which may be performed in accordance with Equation 1, below.

$$CG = (AC * \sin(AEH))/\sin(AHE), \text{ where:} \quad (EQ. 1)$$

AC represents a distance between pixels A and C;

angle $HAE = \pi/2 \pm \theta$, where $\theta$ is an angle between a line between view point and pixel C and a vector 624 that is normal to image plane 608, and where ± handles situations where point E is above or below view cell 602, or vector 624;

angle AEH may be computed as a sin (AF/AE), where AF is a radius of sphere 622, and AE is a distance between points A and E, or a depth value associated with pixel C; and angle AHE can be computed by 180 (degree)−angle AEH−angle HAE.

Calculation of a shrinking amount, such as distance CG, may be implemented with a relatively small number of computer instructions.

For 3-dimensional objects, there may be a family of planes that are tangential to sphere 622 and point E. This may result in a circle on image plane 618, with radius CG. Pixels within a range CG of point C may be nullified. This is referred to herein as a circular filter. Exemplary circular filter-based image reduction is described below with respect to FIG. 7.

Figure 7:
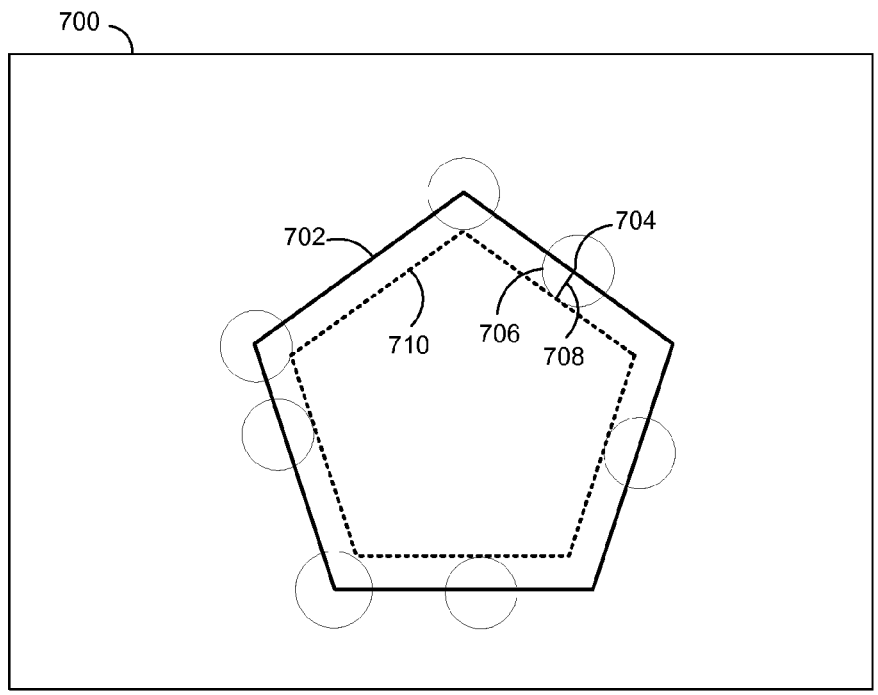
FIG. 7 is a graphical illustration of an exemplary 2-dimensional image plane, including an image of an object projected onto an image plane, and a corresponding reduced-size image.

FIG. 7 is a graphical illustration of an exemplary 2-dimensional image plane 700, including an image 702 of an object projected onto image plane 700. A circular filter may be applied to an edge pixel 704 of image 702, and depth values corresponding to pixels within a circle 706 of radius 708, centered about edge pixel 704, may be nullified. This may be repeated for multiple edge pixels around a circumference of image 702, resulting in a reduced-size image 710.

A shrinking amount, or radius, may be a function one or more of a relative position and orientation of one or more facets of a corresponding object, and a size of a view cell. Thus, different shrinking amounts, or shrinking radii, may be applied to different edge pixels, or sets of edge pixels.

In some situations, shrinking of an image may result in multiple smaller images, and may result in no image. In the latter situation, the corresponding object may be identified as a non-occluding object.

Referring back to FIG. 1, at 106, a second object within the environment is projected to the 2-dimensional image plane.

At 108, the projected second object image is compared to the reduced-sized image of the first object. The comparing may include comparing pixel depth values corresponding to the reduced-sized image and the second object image.

Where the projecting of the first object at 102 includes populating a depth buffer, the depth buffer may be referred to as a local depth buffer, the reducing at 104 may include copying the contents of the local depth buffer to a global depth buffer, the projecting at 106 may include projecting, or rasterizing the second object to the local depth buffer, and the comparing at 108 may include comparing pixel depth values in the local depth buffer to corresponding pixel depth buffers in the global depth buffer.

At 110, the second object is identified as occluded with respect to the view cell when the second object image is occluded by the reduced-size image of the first object. The identification at 110 may include identifying the second object as occluded when pixel depth values of the second object image are greater than corresponding pixel depth values of the reduced-size image of the first object.

Method 100 may be implemented with respect to arbitrary 3-dimensional objects that have no apparent physical attachment to other objects in the 3-dimensional environment.

Method 100 may be implemented to generate a map of multiple occluding objects within an environment, and to compare the objects, or a portion thereof, to the occluder map, relative to view point, to identify objects that are not visible with respect to a view cell. For example, 102 and 104 may be performed repeatedly for a plurality of objects of an environment, and the resultant reduced-size images may be combined to generate an occluder map corresponding to the view cell. Combining of the reduced-size images may include, for each reduced-size object image, copying one or more pixel depth values corresponding to the reduced-size object image to the occluder map when the one or more pixel depth values are less than corresponding pixel depth values in the occluder map. Thereafter, 106, 108, and 110 may be performed for each of the objects of the environment, or a subset thereof, with respect to the view point, to identify objects that are occluded with respect to the view cell. An occluder map may be stored or cached for later use with respect to the view cell.

Figure 1A:
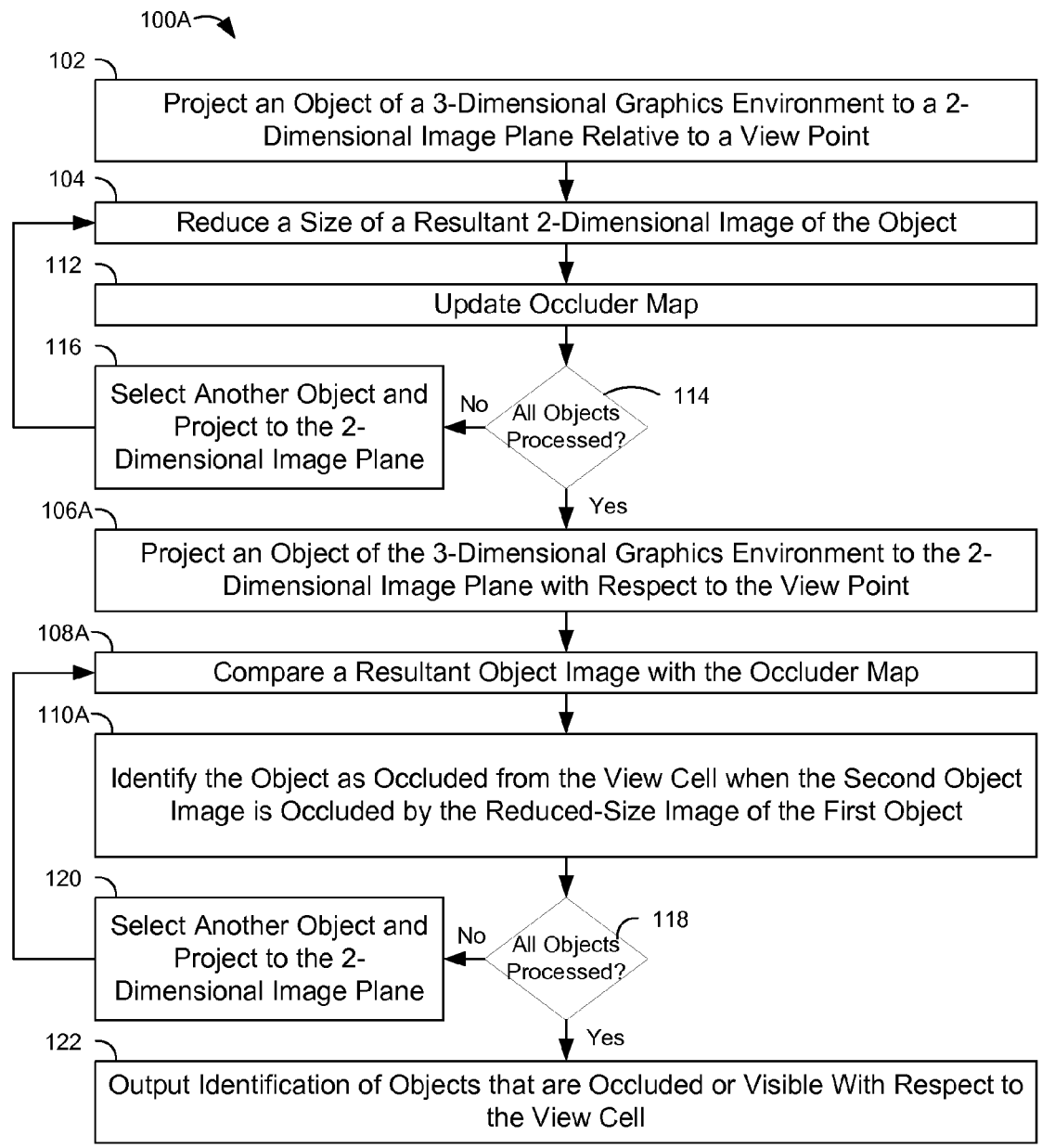
FIG. 1A is a process flowchart of another exemplary method of determining view cell occlusion.

FIG. 1A is a process flowchart of another exemplary method 100A of determining view cell occlusion. Method 100A includes 102 and 104, as described above with respect to FIG. 1, and 106A, 108A, and 110A, which are similar to 106, 108, and 110, as described below.

At 112 in method 100A, an occluder map is updated at 108A with reduced size object image from 104. The projecting and reducing at 102 and 104 are repeated for additional objects of the 3-dimensional environment, selected at 116, and the occluder map is correspondingly repeatedly updated at 112, until a determination is made at 114 that all objects of the 3-dimensional environment have been evaluated.

Thereafter, an object of the 3-dimensional environment is re-projected to the 2-dimensional image plane at 106A, compared to the occluder map at 108A, and identified as occluded or visible at 110A. The re-projecting, comparing, and identifying are repeated for additional objects of the 3-dimensional environment, selected at 120, until a determination is made at 118 that all objects of the 3-dimensional environment have been evaluated.

At 122, an identification of objects identified at 110A may be output.

Method 100 and/or method 100A may include culling objects that are identified as occluded prior to sending objects of the 3-dimensional environment to a graphics pipeline.

In method 100 and/or method 200, the projecting at 102 may include or be proceeded by grouping a set of proximate or adjacent objects, such as objects having coincident edges, and projecting the grouped objects as a single object. This may reduce gaps in the occluder map, and may result in a more comprehensive umbra. Objects that are grouped for the projecting may be compared to the occluder map individually. Object-space acceleration data structures, such as uniform grids, may be utilized, which may reduce processing times. For dynamic geometry, object-space acceleration data structures, such as uniform grids, may be updated incrementally while performing other tasks.

Multiple instances of method 100 and/or method 100A may be implemented within a computer server system that is configured to interface between a 3-dimensional environment and a plurality of user computer systems, to cull objects corresponding to multiple user view cells prior to sending objects of the 3-dimensional environment to corresponding graphics pipelines of the plurality of user computer systems.

Method 100 and/or method 100A may be implemented with respect to a plurality of 2-dimensional image planes of a 3-dimensional view cell, as described below with respect to FIG. 8.

Figure 8:
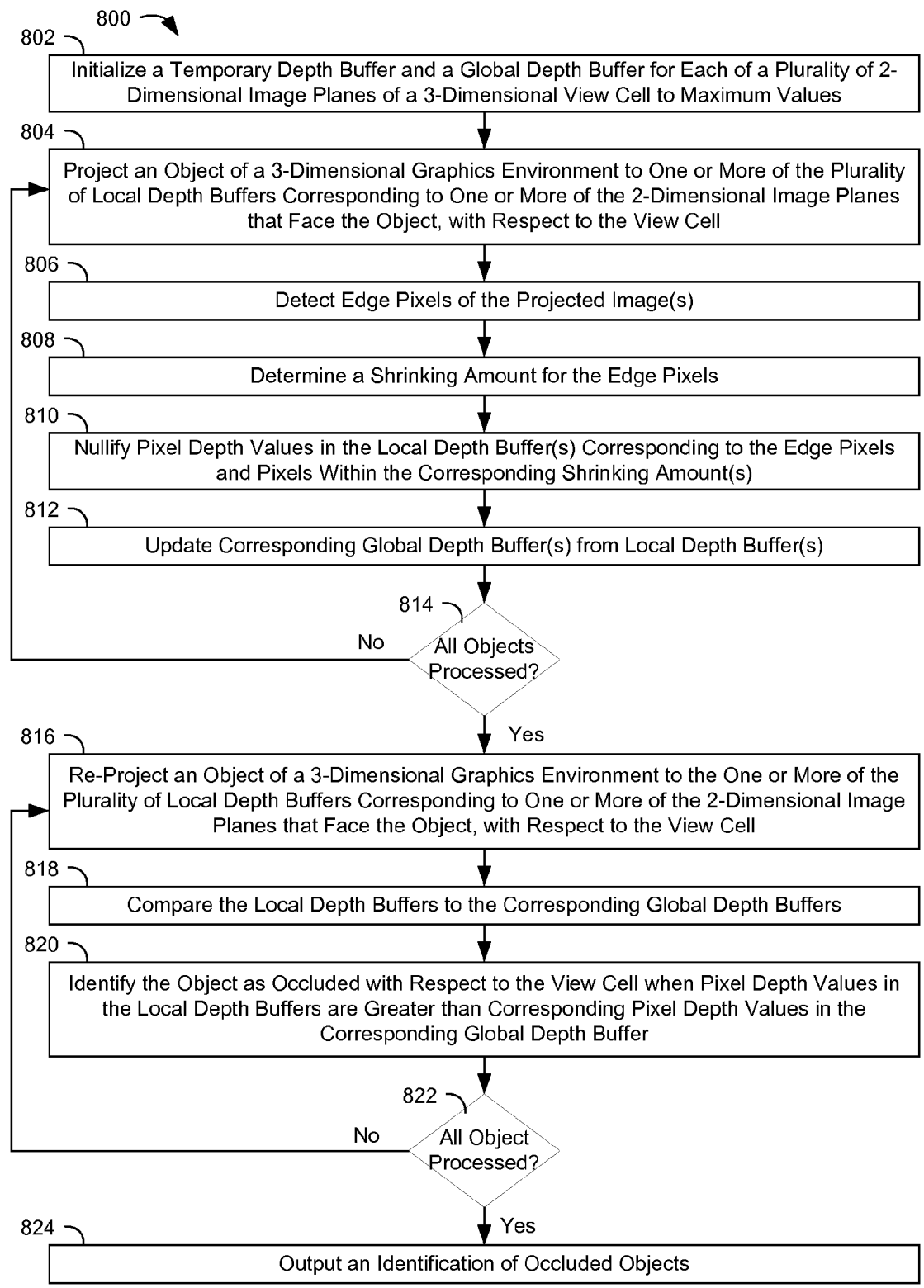
FIG. 8 is a process flowchart of another exemplary method of determining view cell occlusion.

FIG. 8 is a process flowchart of an exemplary method 800 of determining view cell occlusion.

At 802, a local depth buffer and a corresponding global depth buffer are initialized for each of a plurality of 2-dimensional image planes of a 3-dimensional view cell. The initialization may include initializing the pixel depth values to maximum values.

At 804, an object of the environment is projected to one or more of the local depth buffers corresponding to one or more of the 2-dimensional image planes that face the object, with respect to a view point within the view cell.

The projecting may include determining whether the object intersects one or more of the 2-dimensional image plane of the view cell. Where the object intersects an image plane of the view cell, polygons of the object that fall outside of the view cell may be projected to the one or more local buffers in accordance with 804, and polygons of the object that fall within the view cell may be omitted the projecting at 804.

Where the object intersects an image plane of the view cell, the object may be identified as visible with respect to the view cell, and omitted from the re-projecting at 816, the comparing at 818, and the identifying at 820, described below.

The projecting may include clipping an image at edges of an image plane boundary.

Projecting a pixel to a 2-dimension image plane may be omitted when the pixel is not completely encompassed by the object. This may provide a measure of conservativeness to the occluder map.

At 806, edge pixels of the projected image(s) are identified.

At 808, a shrinking amount, or distance is determined for one or more of the edge pixels.

At 810, depth values of the edge pixels, and pixels within the corresponding shrinking distances of the edge pixels, are nullified. The nullifying may include applying a circular filter to the edge pixels and nullifying depth values of pixels within corresponding radii of the edge pixels. Nullifying may include setting pixel depth values to maximum values.

At 812, the global depth buffers are updated with pixel depth values from the corresponding local depth buffers. Updating of the global depth buffers may include copying one or more pixel depth values from the local depth buffers when the one or more pixel depth values in the local depth buffers are less than the corresponding pixel depth values in the global depth buffers.

Updating of the global buffers may include maintaining a bounding box of an image in a local depth buffer, and comparing depth values within the bounding box.

Upon updating of the global depth buffers, the local depth buffers may be re-initialized.

At 814 another object of the 3-dimensional environment may be selected for processing in accordance with 804 through 812. This may be repeated for substantially all objects within the 3-dimensional environment.

As 804 through 814 are repeated for additional objects, the updating of the global depth buffers essentially generates an occluder map of the environment, wherein depth values within the global buffers represent minimum occluder depths, beyond which object are occluded from the view cell. In other words, the depth values in the global depth buffers represent the net effect of the shrunk umbrae, where the shrunk umbrae represent a relatively conservative view of regions that are occluded with respect to the view cell.

When processing in accordance with 804 through 814 is complete, processing proceeds to 816 through 822, to identify, from the view point, objects that are occluded with respect to the view cell.

At 816, an object of the 3-dimensional environment is re-projected to one or more of the local depth buffers corresponding to one or more of the 2-dimensional image planes that face the object, with respect to the view point. Alternatively, a previously projected image of the object may be retrieved from memory or cache.

At 818, the local buffers are compared to the corresponding global buffers.

At 820, the object is identified as occluded with respect to the view cell when the pixel depth values in the local buffers are greater than the corresponding pixel depth values in the global buffers.

The identifying may include identifying an object as occluded with respect to the view cell only when all of the pixel depth values in the local buffers are greater than the corresponding pixel depth values in the global buffers.

The identifying may include identifying an object as not occluded with respect to the view cell when the object projects to only a portion of a pixel with corresponding depth value that is less than a corresponding pixel depth value of the global depth buffer. This may provide a measure of independence with respect to image resolution.

At 822, another object of the 3-dimensional environment may be selected for processing in accordance with 816 through 820. This may be repeated for substantially all objects within the 3-dimensional environment.

At 822, an identification of objects that are occluded with respect to the view cell may be output.

Method 800 may include culling occluded objects prior to sending objects of the environment to a graphics pipeline.

Multiple instances of method 800 may be implemented within a computer server system that is configured to interface between a 3-dimensional environment and a plurality of user computer systems, to cull objects corresponding to multiple user view cells prior to sending objects of the 3-dimensional environment to corresponding graphics pipelines of the plurality of user computer systems.

One or more features described herein with respect to one or more of method 100, method 100A, and method 800 may be implemented alone and in various combinations with one another.

Projecting of objects as disclosed herein may include projecting to a 2-dimensional image plane having a resolution of, for example, 1024×1024 pixels. Lower resolutions may be implemented to reduce processing times. Higher resolutions may be implemented to increase granularity of image shrinking and occluder detection.

When reducing object image sizes, where an object projects to a pixel at a boundary of an image plane, there may not be sufficient neighbor pixels to determine whether the pixel represents an edge of the object. Such pixels may be treated as edge pixels when reducing the image size. Since the pixel may not represent an edge of the object, the image may be unnecessarily reduced in size. This may be the case where a portion of the object that extends outside of an image area of the image plane is clipped when the object is projected to the image plane, and where the clipped portion of the object would have occluded all or a portion of an area of the image that is omitted by the shrinking.

Alternatively, image pixels along a boundary of an object image may be omitted from the image reduction. This may result in overestimating an occlusion area.

Alternatively, or additionally, the projection may include projecting an object to an extended-size image plane relative to the occluder map, wherein a boundary of the occluder map falls within the extended-size image plane. After the object image is reduced in size on the extended image plane, only pixels within the boundary may be considered for generating or updating the occluder map. Examples are described below with respect to FIG. 9.

Figure 9:
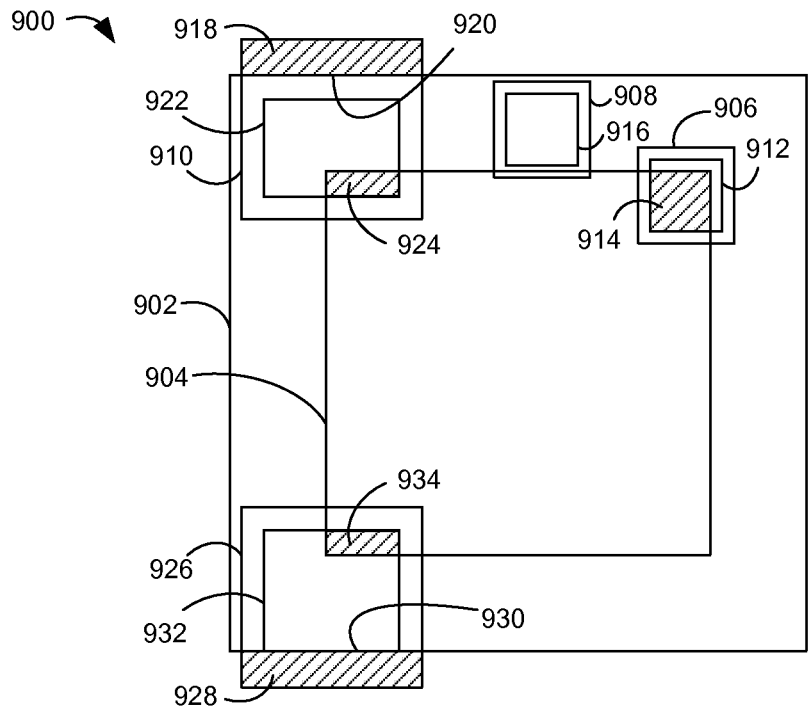
FIG. 9 is a graphic illustration of another exemplary graphics environment, including outer and inner image plane arrays.

FIG. 9 is a graphic illustration of an exemplary graphics environment 900, including outer and inner image planes 902 and 904, respectively, and images 906, 908, 910, and 926, corresponding to respective objects of a 3-dimensional environment. Outer image plane 902 is extended in size relative to inner image plane 904.

Since all of image 906 projects to outer image plane 902, edge pixels may be identified and image 906 may be reduced in size as illustrated by reduced-size image 912. When the occluder map is updated, only pixels with an image portion 914, illustrated with hash-marks, which coincides with inner image plane 904, are considered.

Similarly, since all of image 908 projects to outer image plane 902, edge pixels may be identified and image 908 may be reduced in size as illustrated by reduced-size image 916. No part of reduced-size image 916 falls within inner image plane 904, and thus reduced-size image 916 does not contribute to the occluder map.

Regarding image 910, since a portion 918 of image 910, illustrated with hash-marks, falls outside of outer image plane 902, portion 918 may be clipped when the corresponding object is projected to outer image plane 902. The remaining portion of image 910 that falls within outer image plane 902 may be shrunk as described in one or more examples above. For example, pixels along an edge 920 of the remaining portion of image 910 may be treated as edge pixels for the shrinking, resulting in a reduced-size image 922. When the occluder map is updated, only pixels with an image portion 924, illustrated with hash-marks, which coincides with inner image plane 904, are considered.

Image 926 is similar to image 910, in that a portion 928 of image 926, illustrated with hash-marks, falls outside of outer image plane 902, and thus may be clipped when the corresponding object is projected to outer image plane 902. When shrinking the remaining portion of image 926 that falls within outer image plane 902, pixels along an edge 930 may be treated as non-edge pixels, resulting in a reduced-size image 932. When the occluder map is updated, only pixels with an image portion 934, illustrated with hash-marks, which coincides with inner image plane 904, are considered.

A size difference between inner and outer image planes may be selected as a function of one or more of object sizes and other viewing parameters. An outer image plane size may be, for example and without limitation, approximately 10 to 20 percent larger than an inner image plane.

Where a local depth buffer and a corresponding global depth buffer are maintained, the local and global depth buffers may correspond to respective outer and inner image planes.

One or more features disclosed herein may be implemented in logic, which may include one or more of integrated circuit logic and computer program product logic.

Figure 10:
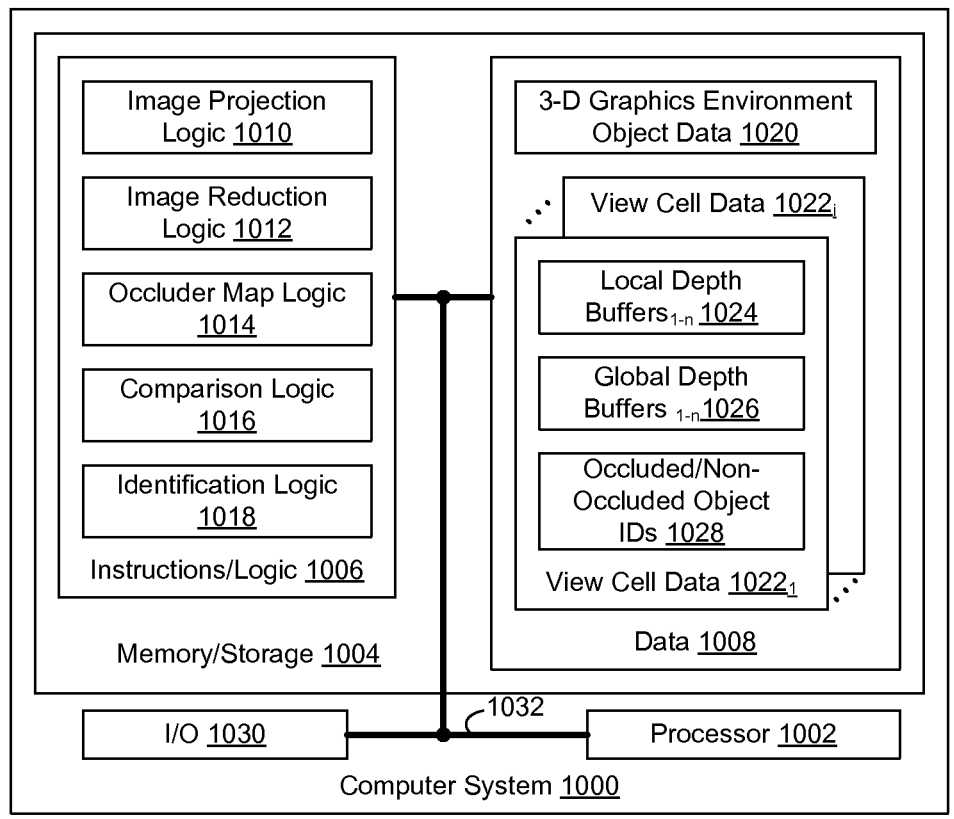
FIG. 10 is a block diagram of an exemplary computer system.

FIG. 10 is a block diagram of an exemplary computer system 1000, including one or more computer instruction processing units, illustrated here as processor 1002, to execute computer program product logic, also known as instructions, code, and software. Processor 1002 may include one or more processors configured to process single-instruction, multiple-data (SIMD), and may be configured to implement one or more of thread-level and data-level parallelism.

Computer system 1000 includes memory/storage 1004, including a computer readable medium having computer program product logic or instructions 1006 stored thereon, to cause processor 1002 to perform one or more functions in response thereto. Logic 1006 may include SIMD instructions.

Memory/storage 1004 further includes data 1008 to be used by processor 1002 in executing instructions 1006, and/or generated by processor 1002 in response to execution of instructions 1006.

In the example of FIG. 10, logic 1006 includes image projection logic 1010 to cause processor 1002 to project objects to one or more 2-dimensional image planes, with respect to a view point, as described above.

Logic 1006 further includes image reduction logic 1012 to cause processor 1002 to reduce sizes of images projected to 2-dimensional image planes, as described above.

Logic 1006 further includes occluder map logic 1014 to cause processor 1002 to generate an occluder map from the reduced-size object images. Occluder map logic 1014 may include logic to cause processor 1002 to copy one or more pixel depth values corresponding to a reduced-size object image to the occluder map when the one or more pixel depth values are less than corresponding pixel depth values in the occluder map.

Logic 1006 further includes comparison logic 1016 to cause processor 1002 to compare projected object images to reduced-size images of occluders, or occluder maps, as described above.

Logic 1006 further includes identification logic 1018 to cause processor 1002 to identify objects that are occluded with respect to a view cell, as described above.

Data 1008 includes 3-dimensional graphics environment object data 1020, including data representative of objects of a 3-dimensional graphics environment.

Data 1008 further includes one or more instances of view cell data, illustrated here as view cell data $1022_1$ through $1022_i$, corresponding to one or more respective view cells. Each instance of view cell data 1022 may include one or more of local depth buffer depth data 1024, global depth buffer data 1026, and data 1028 indicative of one or more occluded objects relative to a corresponding view cell. Each instance of view cell data 1022 may include multiple instances of local depth buffer depth data 1024 and global depth buffer data 1026, corresponding to multiple image planes of a view cell.

Computer system 1000 may include an input/output (I/O) controller 1030.

Computer system 1000 may include a graphics processor card (GPU) to render image data on a display through I/O controller 1030.

Computer system 1000 may be configured as a computer server system to interface through I/O controller 1030 to a plurality of user computer systems, each including one or more GPUs to render image data on corresponding displays.

Computer system 1000 may include a communications infrastructure 1032 to communicate between processor 1002, memory/storage 1004, and I/O controller 1030.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A computer-implemented method, comprising:
projecting a set of first objects of a 3-dimensional graphics environment to a bounded 2-dimensional image plane of a 3-dimensional view cell relative to a first one of multiple view points of the view cell to provide a 2-dimensional image of each first object relative to the first view point;
reducing sizes of the 2-dimensional images of the first objects;
generating an occluder map from the reduced-size 2-dimensional images of the first objects;
projecting a second object of the 3-dimensional graphics environment to the 2-dimensional image plane relative to the first view point of the view cell to provide a 2-dimensional image of the second object relative to the first view point;
identifying the second object as occluded with respect to all view points of the 3-dimensional view cell when pixel depth values of the 2-dimensional image of the second object are greater than corresponding pixel depth values of the occluder map.

2. The method of claim 1, wherein the generating an occluder map includes, for each reduced-size 2-dimensional image, copying a pixel a depth value associated with a pixel of the reduced-size 2-dimensional image to the occluder map when the depth value is less than a depth value associated with a corresponding pixel of the occluder map.

3. The method of claim 1, wherein the reducing includes setting depth values associated with edge pixels of a 2-dimensional image, and pixels proximate to the edge pixels to maximum values.

4. The method of claim 1, wherein the reducing includes:
identifying an edge pixel of a 2-dimensional image of a first object;
determining a reduction distance as a function of at least a distance between the first view point and a surface point of the corresponding first object, and an angle of incidence at the 2-dimensional image plane of a line between the first view point and the surface point; and
setting depth values of the edge pixel and pixels within the reduction distance of the edge pixel to maximum values.

5. The method of claim 4, wherein the determining a reduction distance includes:
determining a plane that is tangential to a sphere surrounding the view cell and that intersects the sphere and a surface point on the object that corresponds to the edge pixel;
determining a line that is parallel with the plane and that intersects the first view point;
determining a position on the 2-dimensional image plane that is intersected by the line; and
determining the reduction distance as a distance between the edge pixel and the position on the 2-dimensional image plane.

6. The method of claim 1, further comprising maintaining a local depth buffer and a global depth buffer, wherein;
the projecting a set of first objects includes, for each first object, storing depth values corresponding to pixels of the first object in the local depth buffer to provide the 2-dimensional image of the corresponding object;
the reducing includes, for each 2-dimensional image in the local depth buffer, setting depth values in the local depth buffer corresponding to edge pixels and pixels proximate to the edge pixels to maximum values to provide the reduced-size 2-dimensional image of the corresponding first object in the local depth buffer;
the generating the occluder map includes, for each reduced-size 2-dimensional image in the local depth buffer, copying a pixel depth value from the local depth buffer to the global depth buffer when the pixel depth value in the local depth buffer is less than a corresponding pixel depth value in the global depth buffer;
the projecting a second object includes storing depth values corresponding to pixels of the second object in the local depth buffer to provide the 2-dimensional image of the second object; and
the identifying includes identifying the second object as not occluded with respect to all view points of the view cell when all pixel depth values of the 2-dimensional image of the second object in the local buffer are greater than the corresponding pixel depth values in the global buffers.

7. The method of claim 1, wherein:
the projecting a set of first objects includes, for each first object, projecting the object to an extended-size 2-dimensional image plane relative to a size of the 2-dimensional image plane of the view cell to provide the 2-dimensional image of the corresponding first object; and
the reducing includes for each first object, discarding pixels of the corresponding 2-dimensional image that are outside of a boundary of the 2-dimensional image plane of the view cell.

8. The method of claim 1, wherein:
the projecting a set of first objects includes identifying a subset of the first objects that are proximate to one another in the 3-dimensional environment and projecting the subset of first objects to the 2-dimensional image plane as a single object; and
the identifying includes comparing the 2-dimensional image of the second object to a reduced-size 2-dimensional image of each first object of the subset.

9. The method of claim 1, further comprising;
identifying an object that intersects the 2-dimensional image plane of the view cell;
performing the projecting a set of first objects, the reducing, and the generating with respect to polygons of the identified object that are outside of the view cell;
omitting polygons of the identified object that are inside the view cell from the projecting a set of first objects, the reducing, and the generating;
omitting the object from the comparing; and
identifying the object as not-occluded with respect to all view points of the view cell.

10. The method of claim 1, wherein, the view cell is bounded by a plurality of 2-dimensional image planes, further including:
performing the projecting a set of first objects, the reducing, the generating, the projecting a second object, the comparing, and the identifying, with respect to multiple ones of the 2-dimensional image planes that face corresponding objects, and with respect to the view point.

11. The method of claim 1, further comprising:
performing the projecting a set of first objects, the reducing, the generating, the projecting a second object, and the identifying for each of a plurality of view cells corresponding to a plurality of users in the 3-dimensional environment; and
culling objects identified as occluded with respect to each of the plurality of view cells from corresponding graphics pipelines.

12. A non-transitory computer readable medium encoded with a computer program, including instructions to cause a processor to:
project a set of first objects of a 3-dimensional graphics environment to a bounded 2-dimensional image plane of a 3-dimensional view cell relative to a first one of multiple view points of the view cell to provide a 2-dimensional image of each first object relative to the first view point;
reduce sizes of the 2-dimensional images of the first objects;
generate an occluder map from the reduced-size 2-dimensional images of the first objects;
project a second object of the 3-dimensional graphics environment to the 2-dimensional image plane relative to the first view point of the view cell to provide a 2-dimensional image of the second object relative to the first view point;
identify the second object as occluded with respect to all view points of the 3-dimensional view cell when all pixel depth values of the 2-dimensional image of the second object are greater than corresponding pixel depth values of the occluder map.

13. The computer readable medium of claim of claim 12, wherein the instructions to generate an occluder map include instructions to cause the processor to copy, for each reduced-size 2-dimensional image, depth value associated with a pixel of the reduced-size 2-dimensional image to the occluder map when the depth value is less than a depth value associated with a corresponding pixel of the occluder map.

14. The computer readable medium of claim 12, wherein the instructions to reduce sizes includes instructions to cause the processor to:
  identify an edge pixel of a 2-dimensional image of a first object;
  determine a plane that is tangential to a sphere surrounding the view cell and that intersects the sphere and a surface point on the first object that corresponds to the edge pixel;
  determine a line that is parallel with the plane and that intersects the first view point;
  determine a position on the 2-dimensional image plane that is intersected by the line;
  determine a distance between the edge pixel and the position on the 2-dimensional plane; and
  set depth values of the edge pixel and pixels within the distance of the edge pixel to maximum values.

15. The computer readable medium of claim 12, further including instructions to cause the processor to maintain a local depth buffer and a global depth buffer, wherein the instructions include instructions to cause the processor to:
  for each first object, store depth values corresponding to pixels of the first object in the local depth buffer to provide the 2-dimensional image of the corresponding first object in the local depth buffer;
  for each 2-dimensional image in the local depth buffer, set depth values in the local depth buffer corresponding to edge pixels and pixels proximate to the edge pixels to maximum values to provide the reduced-size 2-dimensional image of the corresponding first object in the local depth buffer;
  for each reduced-size 2-dimensional image in the local depth buffer, copy a pixel depth value from the local depth buffer to the global depth buffer when the pixel depth value in the local depth buffer is less than a corresponding pixel depth value in the global depth buffer to generate the occluder map;
  store depth values corresponding to pixels of the second object in the local depth buffer to provide the 2-dimensional image of the second object in the local depth buffer; and
  identify the second object as occluded with respect to all view points of the view cell when all pixel depth values of the 2-dimensional image of the second object in the local depth buffer are greater than corresponding pixel depth values of the global depth buffer.

16. The computer readable medium of claim 12, wherein the instructions include instructions to cause the processor to:
  project each first object to an extended-size 2-dimensional image plane relative to a size of the bounded 2-dimensional image plane of the view cell to provide the 2-dimensional images of the corresponding first object; and
  for each first object, discard pixels of the corresponding 2-dimensional image that are outside of a boundary of the 2-dimensional image plane to provide the reduced-size 2-dimensional image of the corresponding first object.

17. The computer readable medium of claim 12, wherein:
  the instructions to project a set of first objects include instructions to cause the processor to identify a subset of the first objects that are proximate to one another in the 3-dimensional environment and project the subset of first objects to the 2-dimensional image plane as a single object; and
  the instructions to identify the second object as occluded include instructions to cause the processor to compare the 2-dimensional image of the second object to a reduced-size 2-dimensional image of each first object of the subset.

18. A system, comprising:
  a computer server system to interface between a plurality of user-computers and a 3-dimensional graphics, interactive, walk-through environment, through a corresponding plurality of graphics pipelines; and
  a non-transitory computer readable medium encoded with a computer program, including instructions to cause the computer server system to,
    project a first set of object of objects of the 3-dimensional graphics environment to a bounded 2-dimensional image plane of a 3-dimensional view cell relative to a first one of multiple view points of the view cell,
    reduce sizes of the 2-dimensional images of the first objects,
    generate an occluder map from the reduced-size 2-dimensional images of the first objects,
    project a second object of the 3-dimensional graphics environment to the 2-dimensional image plane relative to the first view point of the view cell to provide a 2-dimensional image of the second object relative to the first view point;
    identify the second object as occluded with respect to all view points of the view cell when all pixel depth values of the 2-dimensional image of the second object are greater than corresponding pixel depth values of the occluder map.

19. The system of claim 18, wherein the instructions to reduce sizes of object images include instructions to cause the processor to:
  identify an edge pixel of a 2-dimensional image of a first object;
  determine a plane that is tangential to a sphere surrounding the view cell and that intersects the sphere and a surface point on the first object that corresponds to the edge pixel;
  determine a line that is parallel with the plane and that intersects the first view point;
  determine a position on the 2-dimensional image plane that is intersected by the line;
  determine a distance between the edge pixel and the position on the 2-dimensional image plane; and
  set depth values of the edge pixel and pixels within the distance of the edge pixel to maximum values.

20. The system of claim 18, further including instructions to cause the computer server system to:
  maintain a local depth buffer and a global depth buffer for each of a plurality of view cells;
  for each first object, store depth values corresponding to pixels of the first object in the local depth buffer to provide the 2-dimensional image of the corresponding first object in the local depth buffer;
  for each 2-dimensional image in the local depth buffer, set depth values in the local depth buffer corresponding to edge pixels and pixels proximate to the edge pixels to maximum values to provide the reduced-size 2-dimensional image of the corresponding first object in the local depth buffer;

for each reduced-size 2-dimensional image in the local depth buffer, copy a pixel depth values from the local depth buffer to the global depth buffer when the pixel depth value in the local depth buffer is less than a pixel depth value in the global depth buffer to generate the occluder map;

store depth values corresponding to pixels of the second object in the local depth buffer to provide the 2-dimensional image of the second object in the local depth buffer; and identify the second object as occluded with respect to all view points of the view cell when all pixel depth values of the 2-dimensional image of the second object in the local depth buffer are greater than corresponding pixel depth values of the global depth buffer.

* * * * *